(12) United States Patent
Hasegawa

(10) Patent No.: US 6,863,842 B2
(45) Date of Patent: Mar. 8, 2005

(54) CERAMIC OPTICAL COMPONENTS AND PRODUCTION METHOD THEREFOR

(75) Inventor: Masato Hasegawa, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/182,831
(22) PCT Filed: Nov. 29, 2001
(86) PCT No.: PCT/JP01/10460
§ 371 (c)(1), (2), (4) Date: Aug. 2, 2002
(87) PCT Pub. No.: WO02/46120
PCT Pub. Date: Jun. 13, 2002

(65) Prior Publication Data
US 2003/0020887 A1 Jan. 30, 2003

(51) Int. Cl.$^7$ ................................ C04B 35/00
(52) U.S. Cl. ............ 252/584; 252/587; 501/1; 359/356; 359/355; 359/350
(58) Field of Search ............ 501/1; 252/584, 252/587, 623 E, 62.3 ZT; 423/566.1, 504; 359/356, 355, 350

(56) References Cited

U.S. PATENT DOCUMENTS

| | | | | |
|---|---|---|---|---|
| 4,366,141 A | * | 12/1982 | Martin et al. | 423/566.1 |
| 5,183,602 A | * | 2/1993 | Raj et al. | 252/587 |
| 5,502,015 A | * | 3/1996 | Shibata et al. | 501/151 |
| 5,643,505 A | * | 7/1997 | Harris et al. | 264/1.21 |
| 6,111,689 A | * | 8/2000 | Shibata | 359/356 |
| 2001/0035496 A1 | * | 11/2001 | Hasegawa et al. | 250/338.1 |

FOREIGN PATENT DOCUMENTS

| | | |
|---|---|---|
| EP | 1050519 A1 | 11/2000 |
| EP | 1139080 | * 10/2001 |
| JP | 56-87002 | 7/1981 |
| JP | 57-106507 | 7/1982 |
| JP | 61-39001 | 2/1986 |
| JP | 61-205659 | 9/1986 |
| JP | 62-284303 | 12/1987 |
| JP | 6-24828 | 2/1994 |
| JP | 7-86566 | 9/1995 |
| JP | 8-54478 | 2/1996 |
| JP | 8-319150 | 12/1996 |
| JP | 9-21701 | 1/1997 |
| JP | 11-295501 | 10/1999 |

OTHER PUBLICATIONS

L. A. Xue, et al., "Optical Properties of AnS/Diamond Composites", SPIE, vol. 1534, Diamond Optics IV, 1991, pp. 183–196.

Willaim W. Chen, et al., "Characterization of Pore Size Distribution by Infrared Scattering in Highly Dense ZnS", Journal of the American Caramics Society, vol. 76, No. 8, 1993, pp. 2086–2092.

Related U.S. Appl. No. 09/817,155, filed Mar. 27, 2001 (Our Ref. No.: 50395–096).

* cited by examiner

Primary Examiner—C. Melissa Koslow
(74) Attorney, Agent, or Firm—McDermott Will & Emery LLP

(57) ABSTRACT

An optical component formed of a material that blocks noise-causing visible and near-infrared rays selectively or as a whole while transmitting far-infrared rays to the extent possible, and a method for producing the component. The component is produced by adding at least one additive that blocks visible and near-infrared rays to a ceramic material of ZnS, ZnSe, or Ge. The component is most suitable for a particular purpose or use of an optical component, such as a window or lens to be used in a high-performance infrared apparatus, because noise-causing visible and near-infrared rays are blocked.

16 Claims, 3 Drawing Sheets

US 6,863,842 B2

CERAMIC OPTICAL COMPONENTS AND PRODUCTION METHOD THEREFOR

TECHNICAL FIELD

The present invention relates to an optical component transmitting far-infrared rays, and more particularly to an optical component that blocks visible and near-infrared rays and that is used as a component for far-infrared systems. The present invention further relates to a method for producing such an optical component.

BACKGROUND ART

Recent years have seen significant developments in high-performance devices exploiting superior properties of infrared rays. For example, applications relying on the sensing capability of the rays include a surface thermometer that measures the surface temperature of an object on a noncontact basis, a resources survey system that senses the distribution of the resources on the earth from high in the universe, a device that detects an object in a dark field, a security system that detects a human body, and gas-analyzing equipment. There are still other examples such as an infrared image-processing device that processes collected data into images and a high-power laser processing device utilizing the thermal energy of infrared rays.

The increased applications of such high-performance devices using infrared rays have caused a growing demand for enhanced performance and a decrease in the production cost of the optical components, such as windows and lenses, to be incorporated into these devices.

Inorganic materials such as germanium (Ge), zinc selenide (ZnSe), and zinc sulfide (ZnS) have been mainly used as the materials for the optical. components for a wavelength range of 8 to 12 $\mu$m. Polyethylene and other plastic materials, which are less costly and have good processibility, also have been used for the same purpose in recent years. The inorganic materials have occasionally revealed their insufficient properties when used in outdoor-type devices, vehicle-mounted devices subjected to vibration, thumps, and bumps, or other devices exposed to severe operation environments. More specifically, when used singly, they lack in mechanical strength, surface hardness, and resistance to surface oxidation by ultraviolet rays, depending on the operating conditions. To improve their properties, the surface of the inorganic materials has been coated with an environment-resistant layer in some instances. For example, the published Japanese patent application *Tokukaishoh* 56-87002 has disclosed an optical component whose surface is coated with a diamond-like carbon layer transparent to infrared rays. This method, however, increases the production cost considerably.

On the other hand, when a plastic optical component is used, not only the heat resistance but also the mechanical strength as an entire optical component is unavoidably reduced in comparison with the inorganic materials. For example, to increase the transmittance of a plastic optical component, it is necessary to reduce the total thickness of the component. This thickness reduction inevitably reduces the mechanical strength.

The materials for these optical components usually transmit rays in a wide range of wavelengths from visible rays to infrared rays. Consequently, when a system is designed to selectively detect infrared rays, 8 to 12 $\mu$m in wavelength, emitted from the human body, the other rays outside the detecting wavelength range become noise. A typical noise is visible and near-infrared rays from 0.4 to 3 $\mu$m in wavelength. The noise causes malfunction in the signal treating section after the signal detection or reduces the detection accuracy due to the rise in the background level.

To block such a noise, a conventional measure is to form a noise-blocking filter layer on the surface of the main body of an optical component. However, the formation of such a filter layer is costly because the layer is formed by the vapor phase deposition method, such as the sputtering, vacuum deposition, or chemical vapor deposition (CVD) method. Consequently, researchers and engineers have been required to develop an optical component that has sufficient transmittance for infrared rays in a specified wavelength range, that can reliably block visible and near-infrared rays, and that can be produced at low cost. More specifically, the material for the component is required to have the lowest possible transmittance for rays having wavelengths ranging from 0.4 to 3 $\mu$m and the highest possible transmittance for rays having wavelengths ranging from 8 to 12 $\mu$m.

To block visible and near-infrared rays, studies have been done on developing a means in which particles are dispersed in the main body of an optical component to selectively absorb visible and near-infrared rays. In this case, plastic materials are mainly used as the base material. For example, another published Japanese patent application, Tokukaishoh 61-39001, has disclosed an optical component in which a plastic material such as high-density polyethylene is used as the base material to disperse inorganic pigments such as titanium oxide ($TiO_2$), barium sulfate ($BaSO_4$), red iron oxide ($Fe_2O_3$), magnesium oxide (MgO), and zinc (Zn). This component, however, is insufficient in blocking noise-causing rays having wavelengths ranging from 1 to 2 $\mu$m and therefore is unsuitable for a lens to be used in a sensor that selectively detects infrared rays having wavelengths of 3 $\mu$m and more. Yet another published Japanese patent application, Tokukaishoh 62-284303, has disclosed an optical component in which a similar plastic material is used as the base materiel to disperse a zirconium (Zr) compound for selectively transmitting rays having wavelengths ranging from 7 to 14 $\mu$m. However, this material requires the dispersion of a 5 to 15 wt. % Zr compound to sufficiently block of noise. The result is a significant reduction in the transmittance of infrared rays.

To solve the above-described problems, the published Japanese patent application Tokukaihei 9-21701 has disclosed an optical component in which a similar plastic material is used as the base material to disperse at most 4 wt. % ZnS in the form of fine particles. Another published Japanese patent application, Tokukouhei 7-86566, has disclosed an optical component in which a similar plastic material is used as the base material to disperse fine particles of pigments such as iron tritetraoxide ($Fe_3O_4$) particles, carbon black, titanium oxide ($TiO_2$) particles coated with a tin oxide ($SnO_2$) layer, and zirconium oxide ($ZrO_2$) particles. Yet another published Japanese patent application, Tokukaihei 8-54478, has disclosed that it is desirable to use zinc selenide (ZnSe) as the pigment to be dispersed in a similar plastic material for a lens to selectively block near-infrared rays. However, the property of blocking visible and near-infrared rays and the property of transmitting far-infrared rays have a mutually contradictory relationship. Because of this complexity, these methods disclosed so far are incapable of producing a material for an optical component that satisfies both requirements concurrently with a desirable balance. On the other hand, a dense ZnS sintered body has a good transmitting property in a wide infrared range of 1 to 14 $\mu$m. Exploiting this property, the published Japanese patent application Tokukaihei 11-295501 has disclosed a polycrystalline ZnS sintered body having a capability to block visible and near-infrared rays and having an improved property of transmitting far-infrared rays, and a method for producing the sintered body as well. The sintered body is materialized by controlling its porosity. The porosity-controlling method apparently blocks visible rays by scattering them. When the ZnS sintered body is used as a window or lens for a sensor, if the distance between the sensor and the window or lens is large, visible rays can be blocked. However, if the distance is small, the scattered rays can be detected as noise.

DISCLOSURE OF THE INVENTION

An object of the present invention is to solve the above-described problems with optical components for far-infrared systems and to offer an optical component that has increased transmittance for far-infrared rays (wavelength: 8 to 12 μm) and that has an improved property of blocking noise-causing visible and near-infrared rays (wavelength: 0.4 to 3 μm). Another object of the present invention is to offer a method of producing such an optical component.

A ceramic optical component of the present invention, consisting mainly of a ceramic material, transmits far-infrared rays, and blocks visible and near-infrared rays. The component specifically has a transmittance of at most 50% for rays having wavelengths of 3 μm and less and a transmittance of at least 50% for rays having wavelengths ranging from 8 to 12 μm.

The component may have a transmittance of at most 30% for rays having wavelengths of 3 μm and less and a transmittance of at least 50% for rays having wavelengths ranging from 8 to 12 μm. The component may also have a transmittance of at most 5% for rays having wavelengths of 3 μm and less and a transmittance of at least 50% for rays having wavelengths ranging from 8 to 12 μm. The ceramic material of the component may be ZnS. The ceramic material of the component may also be ZnSe or Ge.

The ceramic optical component may contain an additive that blocks rays having wavelengths of 3 μm and less. The additive may be at least one material selected from the group consisting of iron, cobalt, silver, carbon black, iron oxide, graphite, diamond, titanium black, copper, nickel, chromium, gold, manganese, molybdenum, tungsten, silicon, germanium, and their compounds.

According to the present invention, a ceramic optical component is produced by the following steps:

(a) preparing a ceramic material by selecting a powder from the group consisting of powders of ZnS, ZnSe, and Ge;
(b) preparing an additive by selecting at least one powder from the group consisting of powders of iron, cobalt, silver, carbon black, iron oxide, graphite, diamond, titanium black, copper, nickel, chromium, gold, manganese, molybdenum, tungsten, silicon, germanium, and their compounds;
(c) adding the additive to the ceramic material;
(d) mixing the ceramic material and the additive;
(e) forming the mixture; and
(f) sintering the formed body.

BEST MODE FOR CARRYING OUT THE INVENTION

Figure 1:
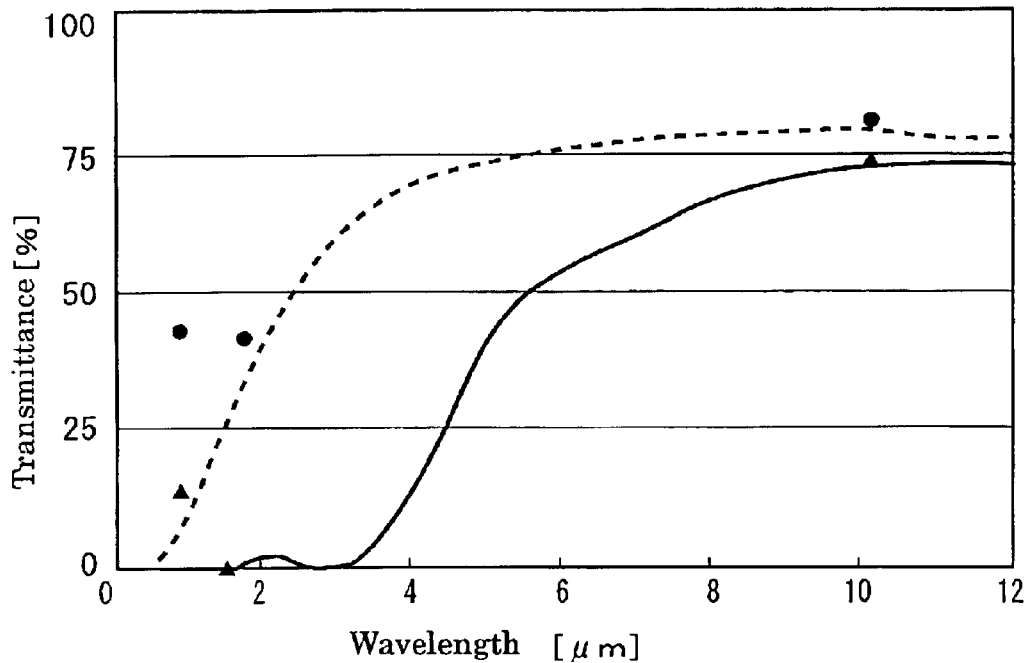
FIG. 1 shows an optical property obtained in Example 1 by a solid line together with an optical property of a conventional ZnS sintered body shown by broken lines for comparison.

A ceramic optical component of the present invention is produced by using a ceramic material having high transmittance for far-infrared rays having wavelengths ranging from 8 to 12 μm, such as a ceramic material consisting mainly of zinc selenide (ZnSe), zinc sulfide (ZnS), barium fluoride (BaF2), gallium arsenide (GaAs), silicon (Si), or germanium (Ge). Of these materials, it is desirable to use a ceramic material consisting mainly of ZnS, because this ceramic material is less costly and has an excellent transmittance-wavelength property. It is also desirable to use a ceramic material consisting mainly of ZnSe or Ge. To increase the transmittance for far-infrared rays, it is desirable that the average crystal grain diameter of the ceramic material be smaller than the wavelength of the rays. In the wavelength range of the far-infrared rays in the present invention, it is desirable that the average crystal grain diameter be less than 8 μm, more desirably less than 5 μm. For the same reason, it is desirable that the grain-boundary phase have a narrow width. Therefore, it is desirable to minimize the amounts of the sintering agents, additives, and impurities, all of which form the grain-boundary phase. When an antireflection coating is provided, the transmittance of the far-infrared rays can be further increased. When Ge is used, the antireflection coating is essential for obtaining the transmittance of the far-infrared rays specified in the present invention.

The types of additives for blocking visible and near-infrared rays having wavelengths ranging from 0.4 to 3 μm include iron, cobalt, silver, carbon black, iron oxide (FeO, $Fe_2O_3$, and $Fe_3O_4$), graphite, diamond, titanium black, copper, nickel, chromium, gold, manganese, molybdenum, tungsten, silicon, germanium, and their compounds. These additives directly absorb visible and near-infrared rays for blocking them. To maintain the transmittance of the far-infrared. rays, it is desirable that the additives to be used have an average particle diameter smaller the wavelength of the rays, i.e., less than 8 μm. To obtain the best balance between the property of blocking visible and near-infrared rays and the property of transmitting far-infrared rays, it is desirable that to the extent possible the particles of the additives be dispersed minutely and uniformly in the base material of the optical component. Consequently, it is desirable that the average particle diameter of the additives be smaller. However, if the average particle diameter is excessively small, individual particles tend to coagulate. Therefore, it is desirable that the average particle diameter be at least 0.01 μm (10 nm). When expressed in ranges, it is more desirable that the diameter be from 0.01 to 2 μm.

The amount of additives in the base material of an optical component is also an important factor for obtaining the best balance between the property of blocking visible and near-infrared rays and the property of transmitting far-infrared rays. Under normal circumstances, it is desirable that the amount of one type of additive added to a ceramic material be from 0.001 to 5 wt. %. However, for the use that places prime importance on the property of blocking noise-causing visible and near-infrared rays, it is desirable to add a small amount of additives that can reliably block visible and near-infrared rays even at the risk of reduction in the transmittance of far-infrared rays. In such a case, it is desirable to add an additive that has high optical density, such as carbon black or graphite. In this case, it is desirable that the added amount be from 0.001 to 0.05 wt. %. On the other hand, for the use that needs to maintain the high transmittance of far-infrared rays, it is desirable to add a relatively large amount of additives that have an optical density lower than the foregoing materials and hence have an inferior property of blocking visible and near-infrared rays and that still have a capability to minimize the reduction in the transmittance of far-infrared rays. The types of such additives include $Fe_3O_4$ and Ag. In this case, it is desirable that the added amount be from 0.01 to 5 wt. %. As described above, to block visible and near-infrared rays without a noticeable reduction in the transmittance of far-infrared rays, it is desirable to determine the optimal amount of addition in accordance with the optical density of the additive. For the use that requires to absorb and hence block visible and near-infrared rays having a specific wavelength, it is desirable to use Fe or Co. These additives block visible and near-infrared rays having a specific wavelength almost without absorbing far-infrared rays. Therefore, to increase the blocking effect on rays having a specific wavelength, it is desirable that the added amount be from 0.01 to 5 wt. %.

To block a wide range of rays from visible rays to near-infrared rays, it is desirable to use at least two types of the above-described additives. As described above, individual additives can block rays having a specific wavelength or reduce the transmittance of visible and near-infrared rays as a whole. Therefore, when the types of additives, the combination of the additives, and the amount of addition are properly selected, the optical properties of a ceramic optical component can be controlled in accordance with the use or purpose. In this case, it is desirable that the total amount of addition be from 0.01 to 10 wt. %.

A method of producing an optical component of the present invention is explained below. The above-described materials are used as the main constituent of the ceramic material of an optical component. The ceramic material is produced by the following process: The powder of the above-described additives is mixed into the powder of the main constituent material. The mixture is formed into a specified shape, and then sintered. The sintered body is finished into the specified final shape. The types, average particle diameter, and added amount of the additives are determined according to the above-described consideration.

It is desirable that the powder of the ceramic material as the main constituent of a ceramic optical component of the present invention have a purity of at least 99.9%. It is also desirable that the powder of the additives have the highest possible purity. The ceramic material may contain a small amount of sintering agents to promote the densification. However, if the added amount is excessively large, the width of the crystal-grain boundary phase increases, decreasing the transmittance. To avoid this adverse effect, the added amount should be minimal. It is better not to use sintering agents. Even if required, it is desirable that the added amount be at most 1 wt. % of the entire material. In a ceramic optical component of the present invention, the particles of the additives are dispersed minutely and uniformly to a large extent in comparison with the conventional component.

To obtain such a dispersed condition, the process for preparing the mixture of the powders of the main constituent and the additives is carried out such that the minute particles of the additives are uniformly dispersed in the ceramic powder of the main constituent without coagulation by using, for example, one of the following methods or a combination of them:

(1) The main constituent and the precursor of the organometallic compounds of the additives are coprecipitated before the sintering to obtain a mixture having an intended composition.

(2) A powder is prepared in advance in which the particles of the main constituent and the particles of the additives or the precursor of the additives are combined.

(3) A small amount of deflocculation agents is added before the mixing to prevent the particles from coagulating.

(4) Supersonic vibrations having a wavelength corresponding to the average particle diameter of the additives are applied at the time of mixing.

(5) The dry-type ball-mill mixing method, which has high pulverizing and mixing effects, is employed to prevent a solvent-assisted composite from coagulating at the time of drying.

In a ceramic optical component of the present invention, it is desirable to use at least two types of additives as described above to block a wide range of rays from visible rays to near-infrared rays. In this case, when the types of additives, the combination of the additives, and the amount of addition are properly selected, a ceramic optical component having the optimal optical property for the intended use can be obtained by controlling both the property of blocking visible and near-infrared rays and the property of transmitting far-infrared rays. Even when two or more types of additives are used, any one or any combination of the above-described mixing methods can be employed.

Subsequently, the mixed ceramic powder prepared in accordance with the above-described method is formed. The formed body is then sintered under proper conditions according to the main ceramic constituent used. During these steps, it is required to minimize the entry of impurities other than the additives used for reducing the transmittance of the ceramic base material. To meet this requirement, it is desirable that the granulation for enhancing the charging property of the mixed powder and the production of the formed body be carried out by a dry system that requires no organic binder. More specifically, it is desirable that the forming be conducted by isostatic pressing. Due consideration must be given to the container and heating atmosphere for the sintering so as not to degrade the ceramic material. The amount of sintering agents should be minimized to prevent the transmittance from decreasing. If normal-pressure sintering has difficulty in densification, pressure sintering such as hot pressing in a mold or hot isostatic pressing (HIP) is effective. When the entry of impurities is suppressed by the above-described methods, the sintered ceramic body has a structure in which minute additives are uniformly dispersed and hence is superior in transmitting far-infrared rays while blocking visible and near-infrared rays.

The sintered body thus obtained is then machined to the shape of the intended optical component. For example, in the case of a filter for an infrared sensor, a circular disk-shaped sintered body is first produced by using a circular sintering mold having a specified diameter, and both main faces of the sintered body are polished to complete the production. In the case of a lens, a similarly obtained circular disk-shaped sintered body is machined to attain a specified shape by using a curve generator or an ultra-precision lathe. If required, an antireflection coating can be provided to those optical components to increase the transmittance of far-infrared rays. To enhance the transmitting property of an optical component, it is desirable to provide an antireflection coating on both main surfaces of the optical component. Nevertheless, a cost-effective way is to provide the coating on one main surface. The antireflection coating is essential for an optical component containing Ge as the main constituent.

EXAMPLE 1

A ceramic material containing ZnS as the main constituent was prepared. As the material for the main constituent, a ZnS powder having an average particle diameter of 1 $\mu$m and a purity of not less than 99.99% was prepared. The following powders were prepared as the additives:

(a) an iron powder: average particle diameter: 2 $\mu$m; purity: not less than 98.2%;

(b) a cobalt powder: average particle diameter: 1 $\mu$m; purity: not less than 99.9%; and (c) an $Fe_3O_4$ powder: average particle diameter: 0.5 $\mu$m; purity: not less than 99.7%.

A 0.2 wt. % iron powder, a 0.2 wt. % cobalt powder, and a 0.01 wt. % $Fe_3O_4$ powder were added to the ZnS powder. The main constituent and additives were mixed for 20 hours by the dry-type ball mill method.

The mixed powder was charged into a rubber mold while being vibrated. A rubber cap was put onto the rubber mold. While being evacuated by a vacuum pump, the rubber mold was sealed. The mold was placed in an isostatic pressing apparatus. The powder was formed into a circular disk by isostatic pressing at a pressure of 98 MPa.

The formed body was placed in a graphite mold accompanied by top and bottom punches for a uniaxial pressing system. The formed body was heated to 1,000° C. under a vacuum of 0.15 Pa to be subjected to a pressure of 40 MPa applied by the top punch for one hour. This hot-press sintering produced a dense sintered body having a relative density of nearly 100%. Here, the relative density means the ratio of the density of the sintered body measured by the submerging method to the theoretical density calculated from the mixed constituents. The top and bottom surfaces of the obtained sintered body were mirror-finished to attain the final shape of a circular disk having a diameter of 55 mm and a thickness of 0.5 mm.

The in-line transmittance of visible and infrared rays of the sample in a thickness direction was measured by using a double-beam-type spectrophotometer. The distance between the sample and the detector was 75 mm. The measured result is shown by a solid line in FIG. 1. FIG. 1 also shows by broken lines a measured result obtained by the same method on a sample having the same size as above, formed by using a polycrystalline ZnS sintered body disclosed in Tokukaihei 11-295501 (hereinafter referred to as the conventional ZnS sintered body). As can be seen from FIG. 1, the conventional ZnS sintered body largely transmits rays having wavelengths ranging from 0.4 to 3 $\mu$m. On the other hand, the ZnS sintered body of the present invention not only almost completely blocks rays having wavelengths ranging from 0.4 to 3 $\mu$m but also notably transmits rays having wavelengths ranging from 8 to 12 $\mu$m as shown by the transmittance of more than 65%. In this example, the transmittance of rays having wavelengths in the vicinity of 2 $\mu$m was about 2.2%. To reduce this transmittance further for effectively blocking all rays having wavelengths ranging from 0.4 to 3 $\mu$m with the additive combination employed in this example, the added amount of the $Fe_3O_4$ powder has only to be increased. For example, when the added amount was increased to 0.02 wt. %, the transmittance for rays having wavelengths in the vicinity of 2 $\mu$m was reduced to less than 0.5% However, the transmittance for rays having wavelengths ranging from 8 to 12 $\mu$m was concurrently reduced by about 5%.

Samples of this example and the conventional ZnS sintered body were subjected to an evaluation test for scattered rays by using laser beams having wavelengths of 830 nm, 1.5 $\mu$m, and 10 $\mu$m. The distance between the sample and the detector was 5 mm. The measured results are also shown in FIG. 1. The point "▲" shows the data for the samples of this example; the point "●," for the samples of the conventional ZnS sintered body. As can be seen from the data, the transmittance measured at the wavelength of 10 $\mu$m is almost the same as that obtained by the spectrophotometer for both this example of the present invention and the conventional ZnS sintered body. On the other hand, when the wavelength decreases to 1.5 $\mu$m and to 830 nm, the transmittance measured by the laser beam becomes higher than that measured by the spectrophotometer. In particular, the conventional ZnS sintered body exhibits a notable increase as shown by the transmittance of more than 40% at 830 nm. This result means that when the conventional ZnS sintered body is used, for example, as the material for a window for an infrared sensor, if the distance between the sensor and the window is small, visible rays can be detected as a noise, thereby decreasing the performance of the sensor. On the other hand, this example of the present invention has a transmittance of less than 15% at 830 nm, thereby eliminating the possibility of the above-described performance reduction. The data shown in FIG. 1 demonstrate that the additives can directly absorb and block visible rays.

EXAMPLE 2

The same ZnS powder as used in Example 1 was prepared as the main constituent. The following powders were prepared as the additives:

(a) a cobalt powder: average particle diameter: 1 $\mu$m; purity: not less than 99.9%;

(b) an iron powder: average particle diameter: 2 $\mu$m; purity: not less than 98.2%; and (c) carbon black: average particle diameter: 0.01 $\mu$m; purity: not less than 99.8%.

A 0.5 wt. % cobalt powder, a 0.5 wt. % iron powder, and 0.001 wt. % carbon black were added to the ZnS powder. The main constituent and additives were mixed for 20 hours by the dry-type ball mill method. A formed body was produced and sintered as with Example 1. The top and bottom surfaces of the sintered body were mirror-finished to attain the final shape of a circular disk having a diameter of 55 mm and a thickness of 0.5 mm. The obtained sintered body was dense as shown by the relative density of nearly 100%.

Figure 2:
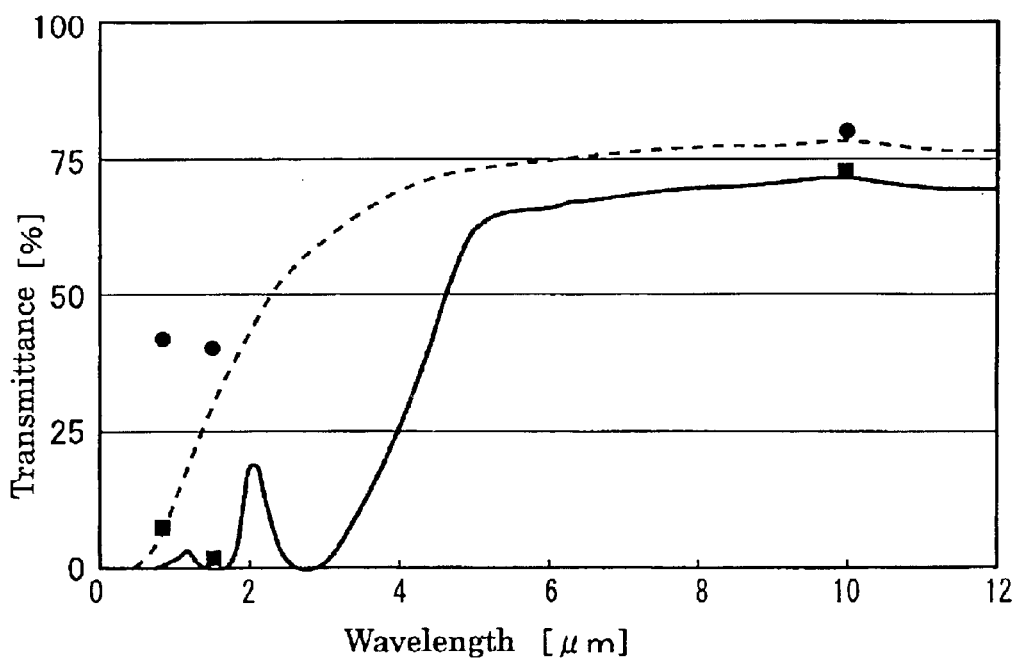
FIG. 2 shows an optical property obtained in Example 2 by a solid line together with an optical property of a conventional ZnS sintered body shown by broken lines for comparison.

The in-line transmittance of the obtained sintered body was measured by using a spectrophotometer and a laser by a method similar to that in Example 1. As with Example 1, the measured results are shown by a solid line and the point "■" in FIG. 2. FIG. 2 also shows the measured results on the conventional ZnS sintered body by broken lines and the point "●," which are the same data that are shown in FIG. 1. As can be seen from FIG. 2, the ZnS sintered body of the present invention not only blocks rays having wavelengths ranging from 0.4 to 3 $\mu$m to less than 20% but also notably transmits rays having wavelengths ranging from 8 to 12 $\mu$m as shown by the transmittance of more than 65%. To effectively block all rays having wavelengths ranging from 0.4 to 3 $\mu$m with the additive combination employed in this example, it was necessary to add at least 0.01 wt. % cobalt, at least 0.01 wt. % iron, and at least 0.001 wt. % carbon black.

The comparison between FIG. 1 and FIG. 2 shows that the additive combination in Example 2 resulted in the high transmittance of about 19% for rays having wavelengths in the vicinity of 2 $\mu$m in comparison with the data obtained by the additive combination in Example 1. However, the measured results by the laser particularly demonstrate that the transmittance for the ray having a wavelength of 830 nm notably reduced to less than 10% in Example 2.

EXAMPLE 3

The same ZnS powder as used in Example 1 was prepared as the main constituent. The following powders were prepared as the additives:

(a) an $Fe_3O_4$ powder: average particle diameter: 0.5 $\mu$m; purity: not less than 99.7%; and (b) a silver powder: average particle diameter: 2 $\mu$m; purity: not less than 99.9%.

A 0.05 wt. % $Fe_3O_4$ powder and a 0.05 wt. % silver powder were added to the ZnS powder. The main constituent and additives were mixed for 20 hours by the dry-type ball mill method. A formed body was produced and sintered as with Example 1. The top and bottom surfaces of the sintered body were mirror-finished to attain the final shape of a circular disk having a diameter of 55 mm and a thickness of 0.5 mm. The obtained sintered body had a density of 4.09 Mg·m$^{-3}$, which is nearly the same as the theoretical density, showing that the body was densely sintered.

Figure 3:
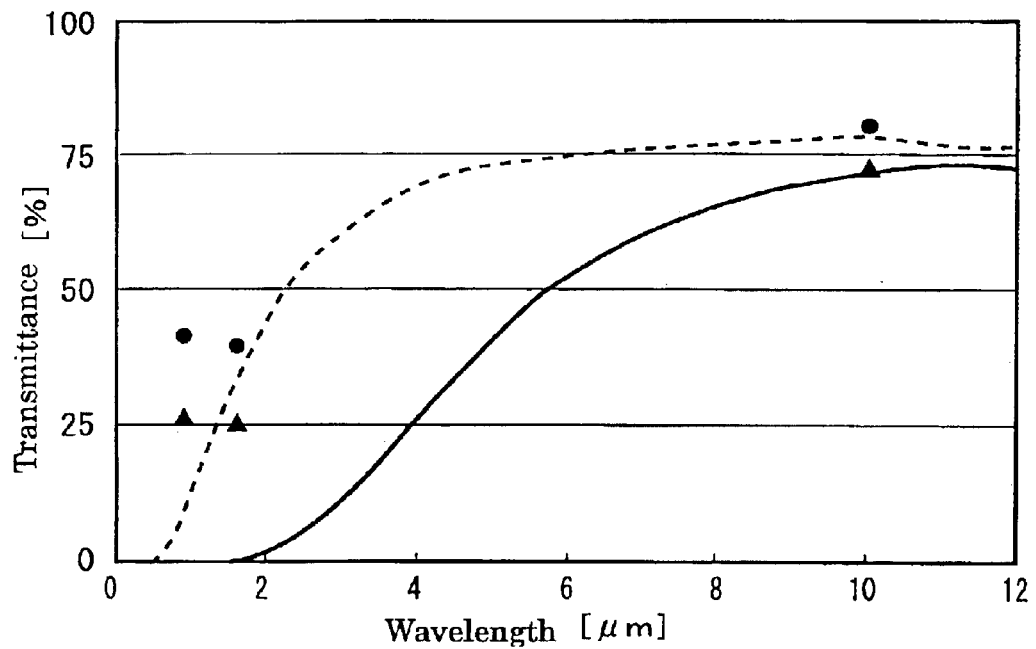
FIG. 3 shows an optical property obtained in Example 3 by a solid line together with an optical property of a conventional ZnS sintered body shown by broken lines for comparison.

The in-line transmittance of the obtained sintered body was measured by using a spectrophotometer and a laser by a method similar to that in Example 1. As with Example 1, the measured results are shown by a solid line and the point "▲" in FIG. 3. FIG. 3 also shows the measured results on the conventional ZnS sintered body by broken lines and the point "●," which are the same data that are shown in FIG. 1. As can be seen from the measured result by the spectrophotometer, the ZnS sintered body of this example blocks rays having wavelengths ranging from 0.4 to 3 $\mu$m to less than 10% in transmittance. Therefore, this ZnS sintered body is suitable for a filter for an infrared sensor to which rays having wavelengths in this range act as a noise and cause the performance reduction. In comparison with FIG. 2, the transmittance for rays having wavelengths of less than 8 $\mu$m decreases and the transmittance for rays having wavelengths ranging from 8 to 12 $\mu$m increases. In other words, the selection of the types and combination of additives can control the blocking and transmitting properties. The measured results by the laser show that the ZnS sintered body of this example notably blocks rays having a shorter wave-length in comparison with the conventional ZnS sintered body. To obtain the intended effects with the additive combination employed in this example, it was necessary to add at least 0.01 wt. % silver and at least 0.01 wt. % $Fe_3O_4$.

EXAMPLE 4

The same ZnS powder as used in Example 1 was prepared as the main constituent. The additives shown in Table 1 were prepared. Each additive was added to the ZnS powder individually. The main constituent and additive were mixed for 20 hours by the dry-type ball mill method. Thus, four types of mixed powders were obtained. Each powder was formed and sintered as with Example 1. The top and bottom surfaces of the sintered body were mirror-finished to attain the final shape of a circular disk having a diameter of 55 mm and a thickness of 0.5 mm. Each sintered body thus obtained was dense as shown by the relative density of nearly 100%.

Figure 4:
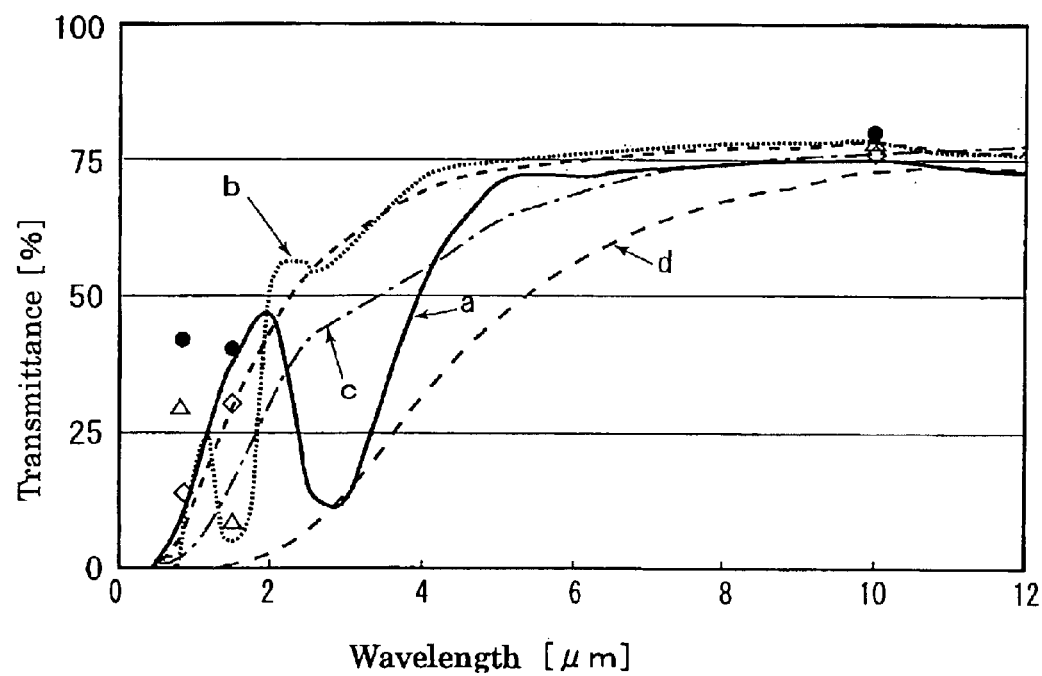
FIG. 4 shows optical properties obtained in Example 4 by the curves "a" to "d" together with an optical property of a conventional ZnS sintered body shown by broken lines for comparison.

The in-line transmittance of each sintered body was measured by using a spectrophotometer and a laser by a method similar to that in Example 1. The measured results are shown by the curves "a" to "d" in FIG. 4. FIG. 4 also shows the measured results on the conventional ZnS sintered body by the broken lines without a sign, which are the same data that are shown in FIG. 1. The signs "a" to "d" correspond to those in Table 1. In FIG. 4, the measured results by the laser on the Fe-added and $Fe_3O_4$-added samples are not shown, those on the Co-added sample are shown by the point "Δ," those on the Ag-added sample are shown by the point "◇," and those on the conventional ZnS sintered body are shown by the point "●." The three points at the wavelength of 10 $\mu$m overlap one another.

TABLE 1

| | Additive | Average particle diameter ($\mu$m) | Purity (%) | Added amount (wt. %) |
|---|---|---|---|---|
| a | Fe | 2 | 98.2 | 0.5 |
| b | Co | 1 | 99.9 | 0.5 |
| c | Ag | 2 | 99.9 | 0.05 |
| d | $Fe_3O_4$ | 0.5 | 99.7 | 0.05 |

In a case such as this example, where only one type of additive is used, each sample shows a specific transmitting property over a range from visible rays to near-infrared rays according to the additive used. The Fe-added sample can selectively absorb rays having wavelengths ranging from 2 to 4 $\mu$m. The Co-added sample selectively absorbs rays having wavelengths ranging from 1 to 2 $\mu$m. The Ag-added sample can decrease the transmittance for visible and near-infrared rays as a whole as shown by the decrease to less than 50% in transmittance for rays having wavelengths ranging from 0.4 to 3 $\mu$m. The $Fe_3O_4$-added sample can also decrease the transmittance for visible and near-infrared rays as a whole as shown by the decrease to less than 20% in transmittance for rays having wavelengths ranging from 0.4 to 3 $\mu$m. Therefore, a sintered body to which only $Fe_3O_4$ is added is suitable for a particular use that requires blocking noise-causing rays having wavelengths ranging from 0.4 to 3 $\mu$m to the lowest possible level. A typical example of such an application is a filter for an infrared sensor. The measured results by the laser in FIG. 4 also shows that the Co-added and Ag-added samples can block scattered visible rays effectively. As described above, when one type of additive is used, rays having wavelengths in a specific range can be blocked in accordance with the type of the additive used.

EXAMPLE 5

A ceramic material containing ZnS was prepared as the main constituent. A ZnS powder having an average particle diameter of 1 μm and a purity of not less than 99.99% was prepared as the material for the main constituent. The following powders were prepared as the additives:

(a) an Fe powder: average particle diameter: 2 μm; purity: 98.2%; and (b) carbon black: average particle diameter: 0.01 μm; purity: 99.8%.

These powders including the ZnS powder were further crushed immediately before the next step. A 0.5 wt. % Fe powder and 0.001 wt. % carbon black were added to the ZnS powder. The main constituent and additives were mixed by the dry-type ball mill method. A formed body was produced and sintered as with Example 1. The sintered body was mirror-finished to attain the shape of a circular disk having a diameter of 30 mm and a thickness of 0.5 mm.

The in-line transmittance of the obtained sintered body was measured by using a spectrophotometer by a method similar to that in Example 1. The measured results are as follows:

transmittance for rays having wavelengths ranging from 0.4 to 1.4 μm: less than 15%;

transmittance for rays having wavelengths ranging from 2.1 to 4.1 μm: less than 15%; and transmittance for rays having wavelengths ranging from 8 to 12 μm: more than 55%.

EXAMPLE 6

A ceramic material containing ZnSe was prepared as the main constituent. A ZnSe powder having an average particle diameter of 1 μm and a purity of not less than 99.99% was prepared as the material for the main constituent. The following powders were prepared as the additives:

(a) an Fe powder: average particle diameter: 2 μm; purity: 98.2%; and (b) carbon black: average particle diameter: 0.01 μm; purity: 99.8%.

A 0.5 wt. % Fe powder and 0.001 wt. % carbon black were added to the ZnSe powder. The main constituent and additives were mixed and formed as with Example 1. The formed body was placed in a graphite mold accompanied by top and bottom punches for a uniaxial pressing system. The formed body was heated to 950° C. under a vacuum of 0.15 Pa to be subjected to a pressure of 40 MPa applied by the top punch for one hour. This hot-press sintering produced a dense sintered body having a density of 5.41 Mg·m$^{-3}$, or a relative density of 100%. The sintered body was mirror-finished to attain the final shape of a circular disk having a diameter of 55 mm and a thickness of 0.5 mm.

Figure 5:
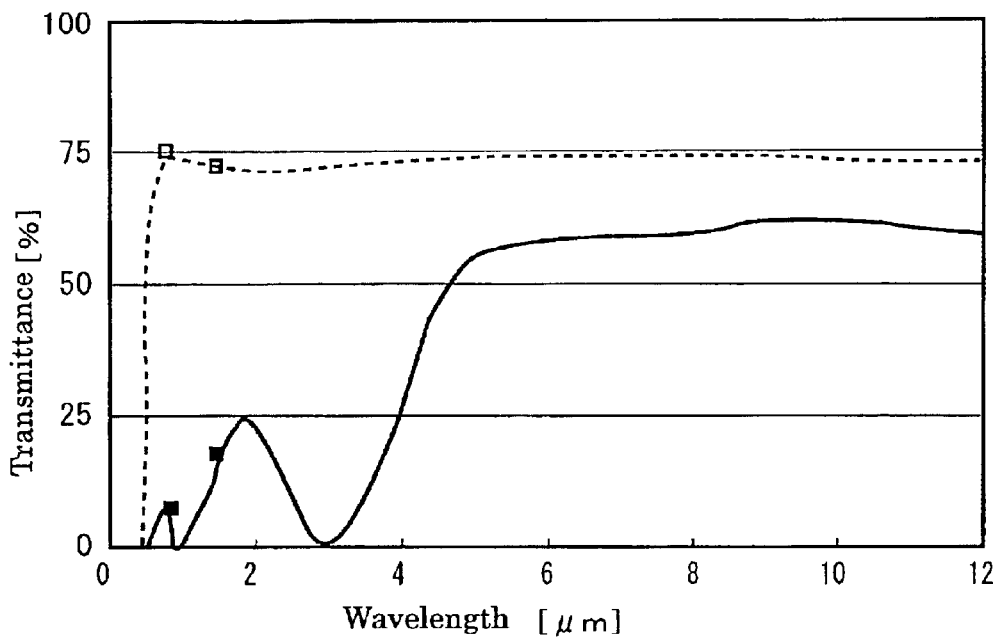
FIG. 5 shows an optical property obtained in Example 6 by a solid line together with an optical property of a conventional ZnSe sintered body shown by broken lines for comparison.

The in-line transmittance of the obtained sintered body was measured by using a spectrophotometer and a laser by a method similar to that in Example 1. As with Example 1, the measured results are shown by a solid line and the point "■" in FIG. 5. FIG. 5 also shows by broken lines and the point "□" the measured results on a ZnSe sintered body produced without using additives. As can be seen from FIG. 5, the ZnSe sintered body having no additives notably transmits rays having wavelengths of 0.4 μm and more, i.e., a wide range of rays from visible rays to far-infrared rays. On the other hand, when the above-described additives are added to a ZnSe sintered body as described above, the transmittance for rays having wavelengths ranging from 0.4 to 3 μm can be reduced to less than 25%, with the transmittance for rays having wavelengths ranging from 8 to 12 μm being maintained at about 60%. The measured results by the laser are almost the same as those by the spectrophotometer for both the ZnSe sintered body of this example and the ZnSe sintered body having no additives. In other words, when ZnSe is used as the main constituent, the adverse effect of the scattering of rays can be reduced to a minimum.

EXAMPLE 7

A ceramic material containing Ge as the main constituent was prepared. As the material for the main constituent, a Ge powder having an average particle diameter of 2 μm and a purity of not less than 99.99% was prepared. As an additive, an Fe powder having an average particle diameter of 2 μm and a purity of 98.2% was prepared. A 0.5 wt. % Fe powder was added to the Ge powder. The main constituent and additive were mixed and formed as with Example 1. The formed body was placed in a graphite mold accompanied by top and bottom punches for a uniaxial pressing system. The formed body was heated to 550° C. under a vacuum of 0.15 Pa to be subjected to a pressure of 40 MPa applied by the top punch for one hour. This hot-press sintering produced a dense sintered body having a density of 5.34 Mg·m$^{-3}$, or a relative density of 100%. The sintered body was mirror-finished to attain the final shape of a circular disk having a diameter of 55 mm and a thickness of 0.5 mm.

Figure 6:
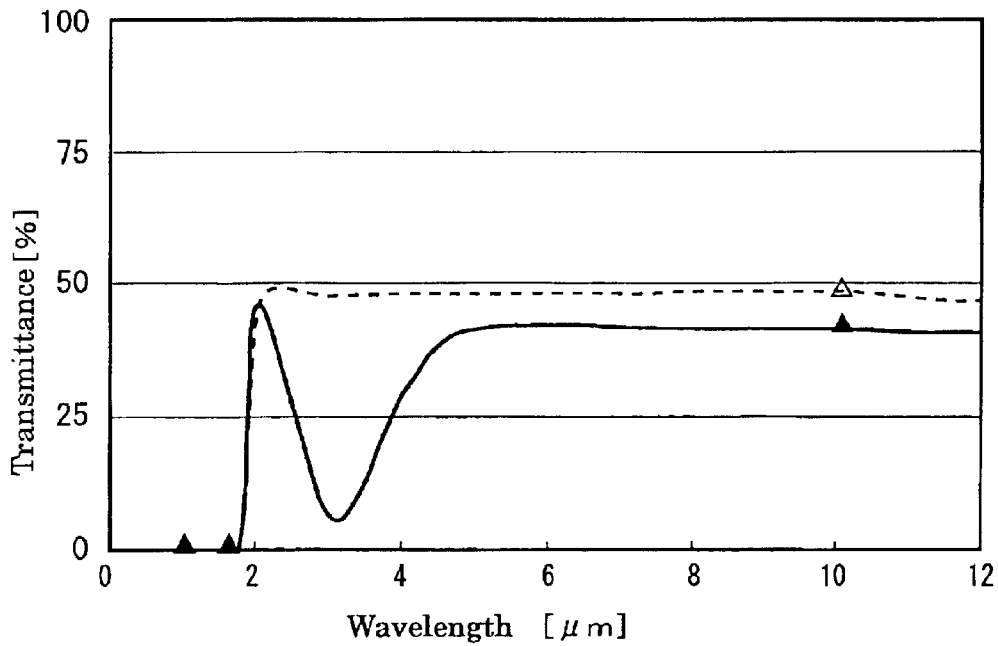
FIG. 6 shows an optical property obtained in Example 7 by a solid line together with an optical property of a conventional Ge sintered body shown by broken lines for comparison.

The in-line transmittance of the obtained sintered body was measured by using a spectrophotometer and a laser by a method similar to that in Example 1. As with Example 1, the measured results are shown by a solid line and the point "▲" in FIG. 6. FIG. 6 also shows by broken lines and the point "△" the measured results on a Ge sintered body produced without using an additive. The two points at the wavelengths of 830 nm and 1.5 μm overlap each other. As can be seen from FIG. 6, the Ge sintered body having no additive notably transmits rays having wavelengths of 2 μm and more, i.e., a wide range of rays from near-infrared rays to far-infrared rays. On the other hand, when the above-described additive is added to a Ge sintered body as described above, whereas the rays having wavelengths ranging from 2 to 4 μm can be selectively blocked, the transmittance for rays having wavelengths ranging from 8 to 12 μm is as low as 40% or so because of the high reflection coefficient of Ge. Therefore, when Ge is used as the main constituent, it is essential to provide an antireflection coating on at least one surface of the sintered body to obtain a transmittance of at least 50%, which is specified in the present invention. The antireflection coating may be provided by any known method.

INDUSTRIAL APPLICABILITY

A ceramic optical component of the present invention has a special optical property in that visible and near-infrared rays are blocked partially or as a whole while far-infrared rays are highly transmitted. This property is rendered by adding to a ceramic material at least one type of additive that blocks visible and near-infrared rays such that the additive is dispersed in the ceramic material unprecedentedly uniformly and minutely. Because of this special property, the present invention can offer a material most suitable for the purpose or use of an optical component, such as a window or lens to be used in a high-performance infrared apparatus.

What is claimed is:

1. A ceramic optical component whose transmittance is 50% or more with respect to wavelengths ranging from 8 through 12 μm while suppressing the transmittance with respect to wavelengths ranging from 0.4 through 3 μm to 50% or less by adding one or more additives that suppress a transmittance for rays having wavelengths ranging from 0.4 through 3 μm, wherein said additive is one or more elements selected from iron, cobalt, silver, carbon black, iron oxide, graphite, titanium black, copper, nickel, chromium, sold, manganese, molybdenum, tungsten, silicon, germanium, or their compounds.

2. A ceramic optical component whose transmittance is 50% or more with respect to wavelengths ranging from 8 through 12 μm while suppressing the transmittance with respect to wavelengths ranging from 0.4 through 3 μm to 30% or less by adding one or more additives that suppress a transmittance for rays having wavelengths ranging from 0.4 through 3 μm.

3. A ceramic optical component whose transmittance is 50% or more with respect to wavelengths ranging from 8 through 12 μm while suppressing the transmittance with respect to wavelengths ranging from 0.4 through 3 μm to 5% or less by adding one or more additives that suppress a transmittance for rays having wavelengths ranging from 0.4 through 3 μm.

4. A ceramic optical component whose transmittance is 50% or more with respect to wavelengths ranging from 8 through 12 μm while suppressing the transmittance with respect to wavelengths ranging from 0.4 through 3μm to 50% or less by adding one or more additives that suppress a transmittance for rays having wavelengths ranging from 0.4 through 3 μm.

wherein the component is 0.5 mm thick.

5. A ceramic optical component as defined in claim 1, wherein the main constituent of said ceramic is zinc sulfide (ZnS).

6. A ceramic optical component as defined in claim 2, wherein the main constituent of said ceramic is zinc sulfide (ZnS).

7. A ceramic optical component as defined in claim 3, wherein the main constituent of said ceramic is zinc sulfide (ZnS).

8. A ceramic optical component whose transmittance is 50% or more with respect to wavelengths ranging from 8 through 12 μm while suppressing the transmittance with respect to wavelengths ranging from 0.4 through 3 μm to 50% or less by adding one or more additives that suppress a transmittance for rays having wavelengths ranging from 0.4 through 3 μm, wherein the main constituent of said ceramic is ZnSe or Ge.

9. A ceramic optical component as defined in claim 2, wherein the main constituent of said ceramic is ZnSe or Ge.

10. A ceramic optical component as defined in claim 3, wherein the main constituent of said ceramic is ZnSe or Ge.

11. The ceramic optical component as defined in claim 2, wherein said additive is one or more elements selected from iron, cobalt, silver, carbon black, iron oxide, graphite, diamond, titanium black, copper, nickel, chromium, gold, manganese, molybdenum, tungsten, silicon, germanium, or their compounds.

12. The ceramic optical component as defined in claim 3, wherein said additive is one or more elements selected from iron, cobalt, silver, carbon black, iron oxide, graphite, diamond, titanium black, copper, nickel, chromium, gold, manganese, molybdenum, tungsten, silicon, germanium, or their compounds.

13. A method for producing a ceramic optical component, comprising the steps of:

preparing a ceramic material by selecting a powder from the group consisting of powders of ZnS, ZnSe and Ge;

adding an additive by selecting at least one powder from the group consisting of powders of iron, cobalt, silver, carbon black, iron oxide, graphite, titanium black, copper, nickel, chromium, gold, manganese, molybdenum, tungsten, silicon, and germanium or their compounds thereto;

mixing the additive and the ceramic material;

forming the mixture; and sintering the formed body thereafter.

14. A ceramic optical components as defined in any one of claim 2, wherein the component is 0.5 mm thick.

15. A ceramic optical components as defined in any one of claim 3, wherein the component is 0.5 mm thick.

16. The method of claim 13, wherein:

the one or more additives suppress a transmittance for rays having wavelengths ranging from 0.4 through 3 μm; and the ceramic component has a transmittance of 50% or more with respect to wavelengths ranging from 8 through 12 μm while suppressing the transmittance with respect to wavelengths ranging from 0.4 through 3 μm to 50%.

* * * * *